US008942513B2

(12) United States Patent
Wu

(10) Patent No.: US 8,942,513 B2
(45) Date of Patent: Jan. 27, 2015

(54) DE-WARPING PROCESSING METHOD FOR DIGITAL IMAGES

(71) Applicant: Vivotek Inc., New Taipei (TW)

(72) Inventor: Jen-Chih Wu, New Taipei (TW)

(73) Assignee: Vivotek Inc., New Taipei (TW)

( * ) Notice: Subject to any disclaimer, the term of this patent is extended or adjusted under 35 U.S.C. 154(b) by 96 days.

(21) Appl. No.: 13/846,213

(22) Filed: Mar. 18, 2013

(65) Prior Publication Data

US 2014/0119653 A1    May 1, 2014

(30) Foreign Application Priority Data

Oct. 31, 2012 (TW) .............................. 101140421 A

(51) Int. Cl.
G06K 9/32 (2006.01)
G06K 9/34 (2006.01)
G06T 3/00 (2006.01)

(52) U.S. Cl.
CPC .................................. *G06T 3/0018* (2013.01)
USPC ......................................... 382/296; 382/173

(58) Field of Classification Search
None
See application file for complete search history.

(56) References Cited

U.S. PATENT DOCUMENTS 5,319,744 A * 6/1994 Kelly et al. .................... 345/647
7,123,777 B2 10/2006 Rondinelli et al.
7,768,545 B2 * 8/2010 Glatt .............................. 348/36

FOREIGN PATENT DOCUMENTS

TW    200947349 A    11/2009
TW    201143352 A    12/2011
TW    201220251 A    5/2012

OTHER PUBLICATIONS

Evans, et al. (Efficient Implementation of Image Warping on a Multimedia Processor), pp. 417-428, 1998 Academic Press.*

* cited by examiner

*Primary Examiner* — Daniel Mariam
(74) *Attorney, Agent, or Firm* — Muncy, Geissler, Olds & Lowe, P.C.

(57) ABSTRACT

A de-warping processing method for digital images includes the following steps. A first image window is segmented into a plurality of first blocks. A second image window is segmented into a plurality of second blocks according to locations and an amount of the first blocks. A coordinate transformation parameter is calculated by a group of first vertex coordinate values of the first block and a group of second vertex coordinate values of the corresponding second block. Each of coordinate values of the first block is transformed into an estimated coordinate value of the corresponding second block according to the coordinate transformation parameter. A pixel content value is obtained from the second image window according to each of the estimated coordinate values, and is written into a pixel with the corresponding coordinate value in the first block. All the first blocks are processed for outputting a first image.

14 Claims, 8 Drawing Sheets

DE-WARPING PROCESSING METHOD FOR DIGITAL IMAGES

CROSS-REFERENCE TO RELATED APPLICATIONS

This non-provisional application claims priority under 35 U.S.C. §119(a) on Patent Application No(s). 101140421 filed in Taiwan, R.O.C. on Oct. 31, 2012, the entire contents of which are hereby incorporated by reference.

BACKGROUND

1. Technical Field

The disclosure relates to a digital image processing method, and more particularly to a de-warping processing method for digital images.

2. Related Art

With the popularization of monitoring equipment, more and more people use monitoring equipments to guarantee life and property safety. To achieve monitoring without any blind angle, some manufacturers come up with panoramic cameras. A panoramic camera may employ a lens group or a single fisheye lens. The advantage of panoramic cameras is that viewers can monitor the scene completely through captured digital images.

Digital images captured by the panoramic camera are warped, so that it is difficult for users to watch a specific region in the digital images. Thus, it is necessary to de-warping the digital images. In the conventional de-warping processing method, a coordinate value of each pixel of a digital image is transformed sequentially, and an interpolation processing is performed on non-integer coordinate values during the transformation. However, the conventional de-warping processing method requires a great deal of computation, so a camera designed in the form of an embedded system with a system on a chip (SoC) may be incapable of bearing the computation amount required by the conventional de-warping processing method.

In order to de-warp digital images captured by the panoramic camera in real-time, the panoramic camera needs to be connected to a computer with high performance, such as a personal computer (PC). Subsequently, the computer with high performance de-warps the digital images. Such complicated image processing will certainly increase the cost of installing a monitoring system, and more importantly will affect the scalability of the monitoring system.

SUMMARY

A de-warping processing method for digital images, used for outputting a first image at a first image window according to a partial region of a second image in a second image window, includes the following steps. A first image window is segmented into a plurality of first blocks. A second image window is segmented into a plurality of second blocks according to locations of the first blocks and an amount of the first blocks. A coordinate transformation parameter is calculated by a group of first vertex coordinate values of the first block and a group of second vertex coordinate values of the corresponding second block. Each of coordinate values of the first block is transformed into an estimated coordinate value of the corresponding second block according to the coordinate transformation parameter. A pixel content value, e.g. color or brightness, is obtained from the second image window according to each of the estimated coordinate values, and is written into a pixel with the corresponding coordinate value in the first block. All the first blocks are processed for outputting a first image.

A de-warping processing method for digital images, used for outputting a first image in a first image window according to a partial region of a second image in a second image window, includes the following steps. The first image window is segmented into a plurality of first blocks. The second image window is segmented into a plurality of second blocks according to an amount of the plurality of first blocks and locations of the plurality of first blocks. A coordinate transformation parameter is calculated by a group of first vertex coordinate values of one of the plurality of first blocks and a group of second vertex coordinate values of corresponding one of the plurality of second blocks. The step of calculating the coordinate transformation by the group of first vertex coordinate values of the one of the plurality of first blocks and the group of second vertex coordinate values of the corresponding one of the plurality of second blocks is repeated until all the first blocks are processed, and then the coordinate transformation parameters are recorded in a lookup table. A panoramic image is loaded into the second image window and is segmented into a plurality of third blocks. An amount of the third blocks is the same as an amount of the second blocks. According to the coordinate transformation parameters in the lookup table, each of coordinate values of the first blocks is transformed into an estimated coordinate value in the corresponding third block. A pixel content value is obtained from the second image window according to the estimated coordinate value, and is written into a pixel with the corresponding coordinate value in the first image window.

BRIEF DESCRIPTION OF THE DRAWINGS

The disclosure will become more fully understood from the detailed description given herein below for illustration only and thus does not limit the disclosure, wherein.

DETAILED DESCRIPTION

Figure 1:
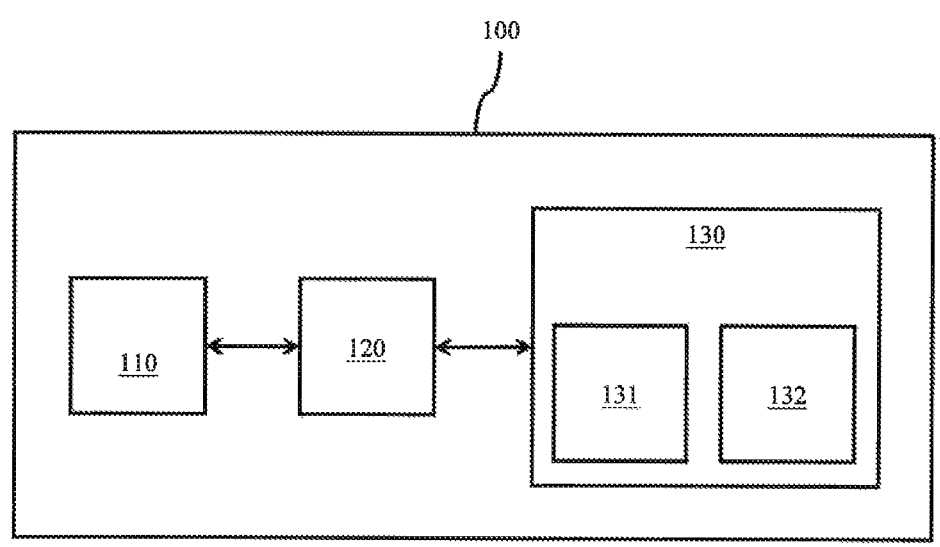
FIG. 1 is a schematic structural view of the disclosure.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

A de-warping processing method for digital images in the disclosure can be applied to an electronic device, e.g. a digital image processing device, and can also be implemented through a computer. Hereinafter, a digital image processing device is taken as an example for description. FIG. 1 is a schematic structural view of the disclosure. A digital image processing device 100 of the disclosure includes an image input unit 110, a processing unit 120 and a storage unit 130.

The processing unit 120 is electrically connected to the image input unit 110 and the storage unit 130. The image input unit 110 is used for inputting (or shooting) digital images. The digital image is, for example, a static image or a dynamic video. The image input unit 110 is, for example, a photosensitive component or other input interfaces capable of shooting panoramic images. The digital image in the disclosure is shot in a panoramic manner or a fisheye manner, so the object and background in the shot image are distorted.

To clearly describe the operation of the disclosure, a first image window and a second image window are respectively used for displaying a first image and a second image in the disclosure. In this and some embodiments, the first image window and the second image window can be shown to a user. In this embodiment and some embodiments, the first image window and the second image window can be used for computing and not be shown to the user. In this embodiment and some embodiments, display areas (resolutions) of the first image window and the second image window are the same, or the display area of one of the first image window and the second image window is zoomed in or zoomed out in fixed proportion to the other one. For example, the first image window and the second image window respectively have 640*480 pixels. Hereinafter, the first image window and the second image window having the same resolution are taken as an example for description.

The first image window is used for displaying a first image which the de-warping processing method has been performed on. The second image window is used for displaying a digital image acquired in the panoramic manner, so that the subject or the background of the second image is distorted.

The storage unit 130 is used for storing a de-warping program 131 and a lookup table 132. The lookup table 132 records a plurality of groups of coordinate transformation parameters used for performing the de-warping processing method on the second image to result the first image. The processing unit 120 performs the de-warping processing method of the disclosure on the second image to result the first image. The de-warping processing method is described as follows.

Figure 2:
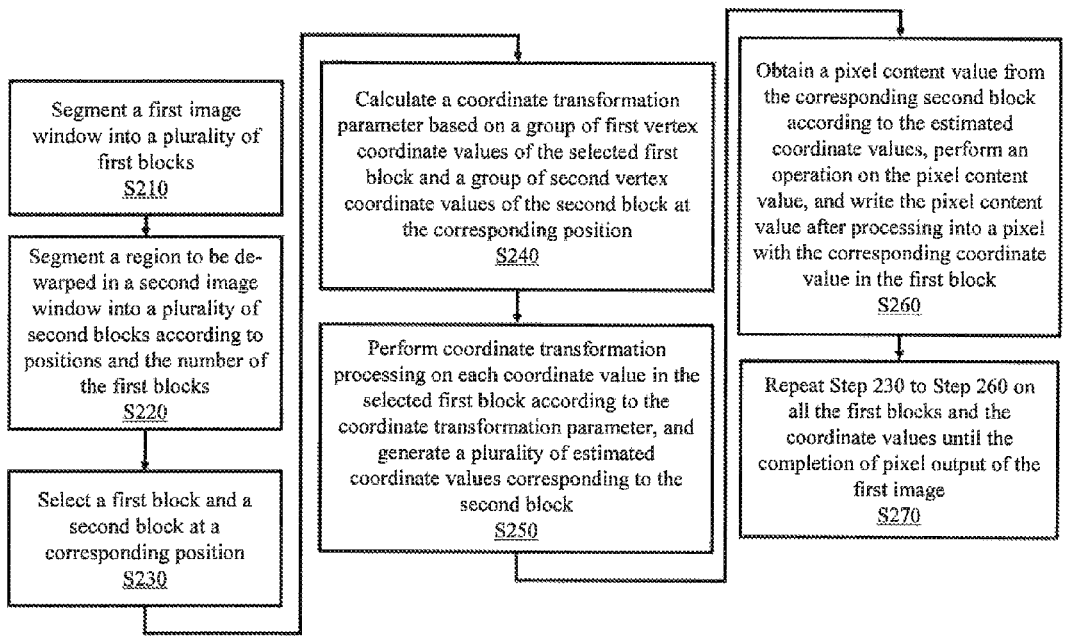
FIG. 2 is a flow chart of a de-warping processing method according to the disclosure.

FIG. 2 is a schematic flow chart of a de-warping processing method according to the disclosure. The de-warping processing method of the disclosure performed with the de-warping program 131 includes the following steps.

A first image window is segmented into a plurality of first blocks (step S210). A desired region of a second image window is segmented into a plurality of second blocks according to locations of the first blocks and an amount of the first blocks (step S220). One of the first blocks and corresponding one of the second blocks are selected (step S230). By a group of first vertex coordinate values of the selected first block and a group of second vertex coordinate values of the selected second block, a coordinate transformation parameter is calculated (step S240). Coordinate values of the selected first block are transformed into estimated coordinate values corresponding to the selected second block according to the coordinate transformation parameter (step S250). In step S260, a pixel content value of each of the estimated coordinate value is obtained and computed from the selected second block, and is written into a pixel with the corresponding coordinate value in the selected first block. Step 230 to step 260 are repeated to process all the first blocks and their coordinate values for outputting the first image. The detail of the de-warping processing method is described as follows.

Figure 3B:
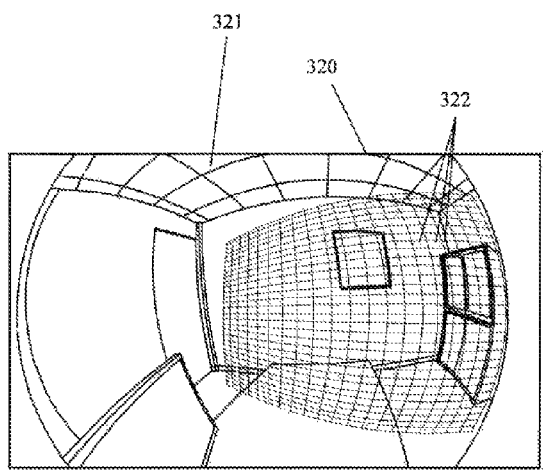
FIG. 3B is a schematic view of second blocks according to the disclosure.
Figure 3A:
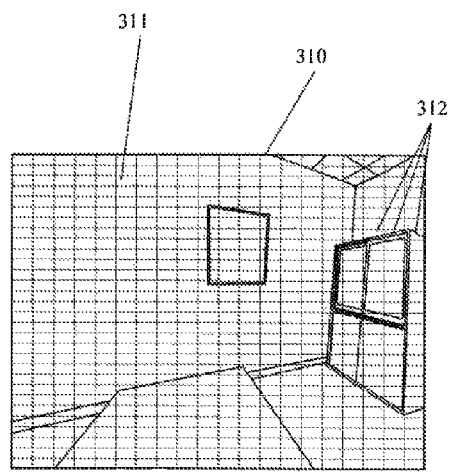
FIG. 3A is a schematic view of first blocks according to the disclosure.

Referring to FIG. 3A, the processing unit 120 first segments a first image window 310 where a first image 311 is displayed, into a plurality of first blocks 312. The first image 311 of the first image window 310 is rectangular, so the first image 311 can be segmented into smaller rectangles.

Referring to FIG. 3B, the processing unit 120 segments a desired region of a second image window 320 where a second image 321 is displayed, into a plurality of second blocks 322 according to an amount and locations of the first blocks 312. The second image 321 is a panoramic image, so all second blocks 322 obtained by segmenting the second image 321 are not the same quadrangles. Moreover, all four sides of the second block 322 are not straight lines. For example, the edges of the second image 321 are arcs, so that the edges of the second blocks 322 in the second image 321 are arcs. The second blocks 322 belong to a part of the second image 321, so the coordinate value of each pixel in the second block 322 can be defined through a coordinate system of the second image window 320.

As described above, the first block 312 is rectangular, so the first block 312 has four vertex coordinate values which are defined as a group of first vertex coordinate values hereinafter. Similarly, a group of second vertex coordinate values of the corresponding second block 322 can be acquired from the second image window 320. Then, the processing unit 120 selects one of the first blocks 312 and corresponding one of the second blocks 322 in sequence, and performs a coordinate transformation procedure, e.g. an affine transformation procedure or a perspective transformation procedure, on a group of first vertex coordinate values of the first block 312 and a group of second vertex coordinate values of the corresponding second block 322 to calculating a coordinate transformation parameter by the group of first vertex coordinate values of the first block 312 and the group of second vertex coordinate values of the corresponding second block 322.

Affine Transformation Procedure

Figure 4A:
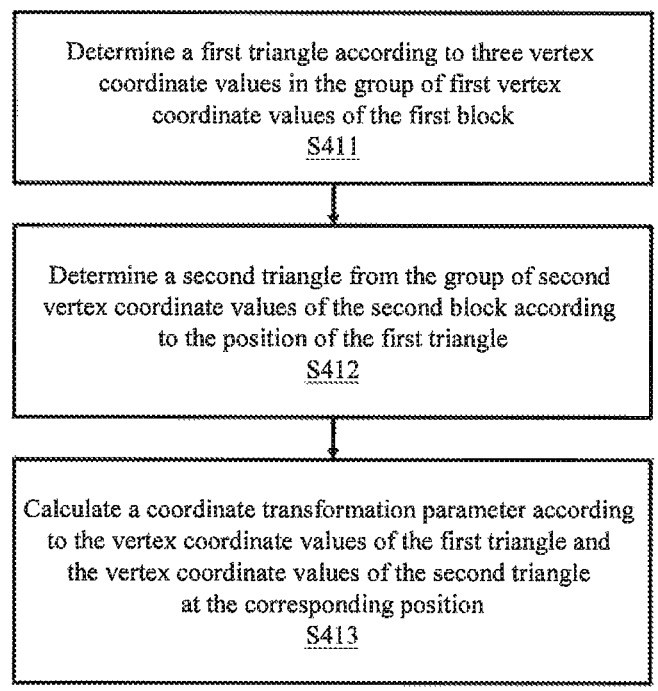
FIG. 4A is a flow chart of an affine transformation procedure according to the disclosure.

FIG. 4A is a flow chart of an affine transformation procedure according to the disclosure. Firstly, a first triangle is defined according to three vertex coordinate values in the group of first vertex coordinate values of the first block (step S411). A second triangle is defined from the group of second vertex coordinate values of the second block according to the location of the first triangle (step S412).

A coordinate transformation parameter is calculated by the vertex coordinate values of the first triangle and the vertex coordinate values of the second triangle (step S413). The detail of the affine transformation procedure is described as follows.

The first block 312 is rectangular, so the first block 312 can be segmented into two triangles not overlapping each other, one of which is defined as a selected first triangle 318. After the processing unit 120 obtains a second block 322, which is at a location corresponding to the location of the first block 312, from the second image window 320, the processing unit 120 defines a second triangle 328 according to the second vertex coordinate values of the second block 322 and the location of the first triangle 318, as shown in 4B. For example, if an upper left part of the first block 312 is defined as the first triangle 318, the processing unit 120 correspondingly defines an upper left part of the second block 322 as the second triangle 328.

The processing unit 120 calculates a coordinate transformation parameter according to vertex coordinate values of the first triangle 318 and vertex coordinate values of the second triangle 328 by an affine transformation formula (Formula 1) as follows:

$$\begin{bmatrix} X_i \\ Y_i \end{bmatrix} = \begin{bmatrix} a_1 & a_2 & a_3 \\ b_1 & b_2 & b_3 \end{bmatrix} \begin{bmatrix} X_o \\ Y_o \\ 1 \end{bmatrix} \qquad \text{Formula 1}$$

$(X_i, Y_i)$ is the vertex coordinate value of the second triangle 328, $(X_o, Y_o)$ is the vertex coordinate value of the first triangle 318, and $(a_1, a_2, a_3, b_1, b_2, b_3)$ is the coordinate transformation parameter.

In this embodiment and some embodiment, the processing unit 120 substitutes the tree vertex coordinate values of the first triangle 318 and the tree vertex coordinate values of the second triangle 328 into Formula 1, and then obtains linear equations in six variables. Subsequently, the processing unit 120 calculates all elements of the coordinate transformation parameter by solving the linear equations in six variables. The processing unit 120 further calculates, according to the coordinate transformation parameter, coordinate values of corresponding pixels of the second triangle 328 defined by mapping the pixels of the first triangle 318. The operation of calculating the coordinate values of corresponding pixels of the second triangle 328 will be described later.

Furthermore, the first block 312 further has a third triangle 319. The first triangle 318 and the third triangle 319 do not overlap each other. The second block 322 includes the second triangle 328 and a fourth triangle 329. The second triangle 328 corresponds to the fourth triangle 329. The coordinate transformation parameter associated with the third triangle 319 and the fourth triangle 329 can be calculated by an affine transformation formula (Formula 1-1) as follows:

$$\begin{bmatrix} X_j \\ Y_j \end{bmatrix} = \begin{bmatrix} a_1 & a_2 & a_3 \\ b_1 & b_2 & b_3 \end{bmatrix} \begin{bmatrix} X_k \\ Y_k \\ 1 \end{bmatrix}; \qquad \text{Formula 1-1}$$

wherein $(X_j, Y_j)$ is the vertex coordinate of the fourth triangle, $(X_k, Y_k)$ is the vertex coordinate of the third triangle, and $(a_1, a_2, a_3, b_1, b_2, b_3)$ is the coordinate transformation parameter.

In an embodiment of the disclosure, the coordinate transformation parameter associated with the first triangle 318 and the second triangle 328 are directly set as the coordinate transformation parameter associated with the third triangle 319 and the fourth triangle 329.

In another embodiment of the disclosure, the processing unit 120 determines whether a shape difference between the second triangle 328 and the fourth triangle 329 is greater than a threshold value. In an embodiment, the shape difference can equal to an area difference between the second triangle 328 and the fourth triangle 329. If the shape difference between the second triangle 328 and the fourth triangle 329 is smaller than the threshold value, the fourth triangle 329 is regarded as being the same as the second triangle 328. Herein, the coordinate transformation parameter associated with the first triangle 318 and the second triangle 328 is directly set as the coordinate transformation parameter associated with the third triangle 319 and the fourth triangle 329. If the shape difference between the second triangle 328 and the fourth triangle 329 is greater than the threshold value, the coordinate transformation parameter associated with the second triangle 328 and the fourth triangle 329 are further calculated and obtained.

Perspective Transformation Procedure

Figure 4B:
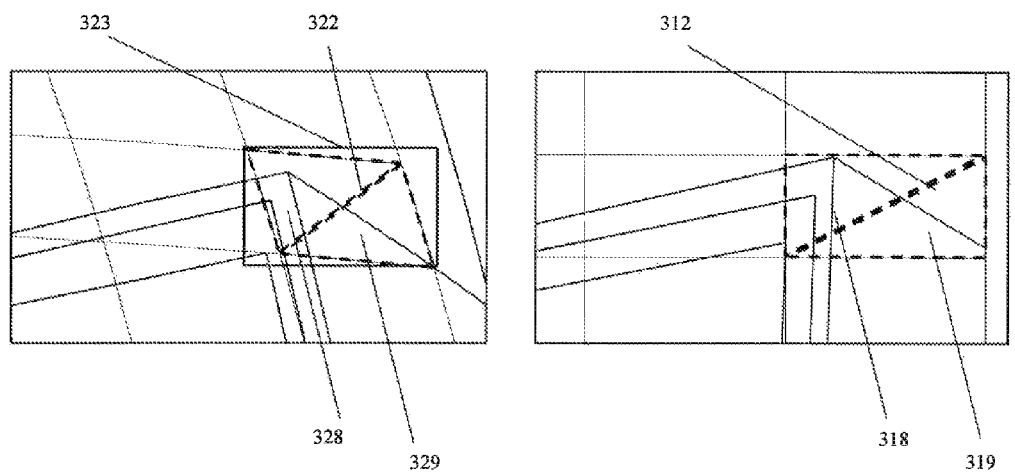
FIG. 4B is a schematic view of a selected first triangle and a selected second triangle according to the disclosure.
Figure 4C:
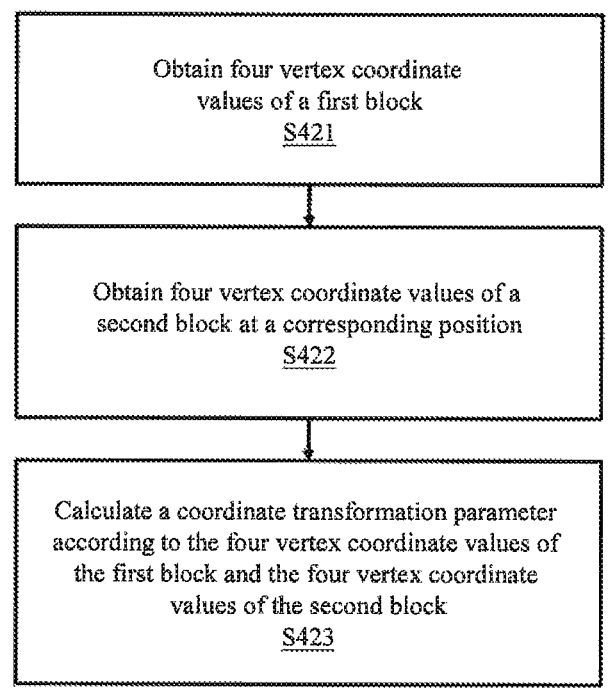
FIG. 4C is a flow chart of a perspective transformation procedure according to the disclosure.

FIG. 4C is a flow chart of a perspective transformation procedure according to the disclosure. The perspective transformation procedure of the disclosure includes the following steps.

Firstly, the four vertex coordinate values of the selected first block are obtained (step S421). The four vertex coordinate values of the selected second block are obtained (step S422).

The coordinate transformation parameter is calculated according to the four vertex coordinate values of the selected first block and the four vertex coordinate values of the selected second block (step S423). The detail of the perspective transformation procedure is described as follows.

The processing unit 120 obtains the four vertex coordinate values of the selected first block 312 and the four vertex coordinate values of the selected second block 322. The processing unit 120 then calculates the coordinate transformation parameter according to the vertex coordinate values of the selected first block 312 and the selected second block 322 by Formula 2 as follow:

$$X_i = \frac{a_1 X_o + a_2 Y_o + a_3}{c_1 X_o + c_2 Y_o + 1} \qquad \text{Formula 2}$$

$$Y_i = \frac{b_1 X_o + b_2 Y_o + b_3}{c_1 X_o + c_2 Y_o + 1}$$

$(X_i, Y_i)$ is the vertex coordinate value of the second block 322, $(X_o, Y_o)$ is the vertex coordinate value of the first block 312, and $(a_1, a_2, a_3, b_1, b_2, b_3, c_1, c_2)$ is the coordinate transformation parameter.

All the vertex coordinate values of the first block 312 are defined as a group of first vertex coordinate values. Similarly, all the vertex coordinate values of the second block 322 are defined as a group of second vertex coordinate values from the second image window 320. After the first vertex coordinate values and the second vertex coordinate values are substituted into Formula 2, linear equations in eight variables are obtained, and the coordinate transformation parameter is calculated by solving the linear equations in eight variables.

After obtaining the coordinate transformation parameter, the processing unit 120 performs a coordinate transformation procedure on each coordinate value in the first block 312. Thus, each coordinate value in the first block 312 can correspond to a coordinate value in the second image window 320. The obtained coordinate value in the second image window 320 is defined as an estimated coordinate value hereinafter.

The processing unit 120 obtains a pixel content value according to the estimated coordinate value. Coordinate values in a digital image are in the form of integers. For example, a coordinate value of a pixel in the second image window 320 is (100, 100) or (123, 321). However, a result of calculating the estimated coordinate value may be not in the form of integers. Therefore, if an estimated coordinate value is not in the form of integers, coordinate values of pixels closed the most to the estimated coordinate value not in the form of integers are employed to calculate the pixel content value written into a corresponding pixel in the first block 312. The detailed operation is described as follows.

Figure 5:
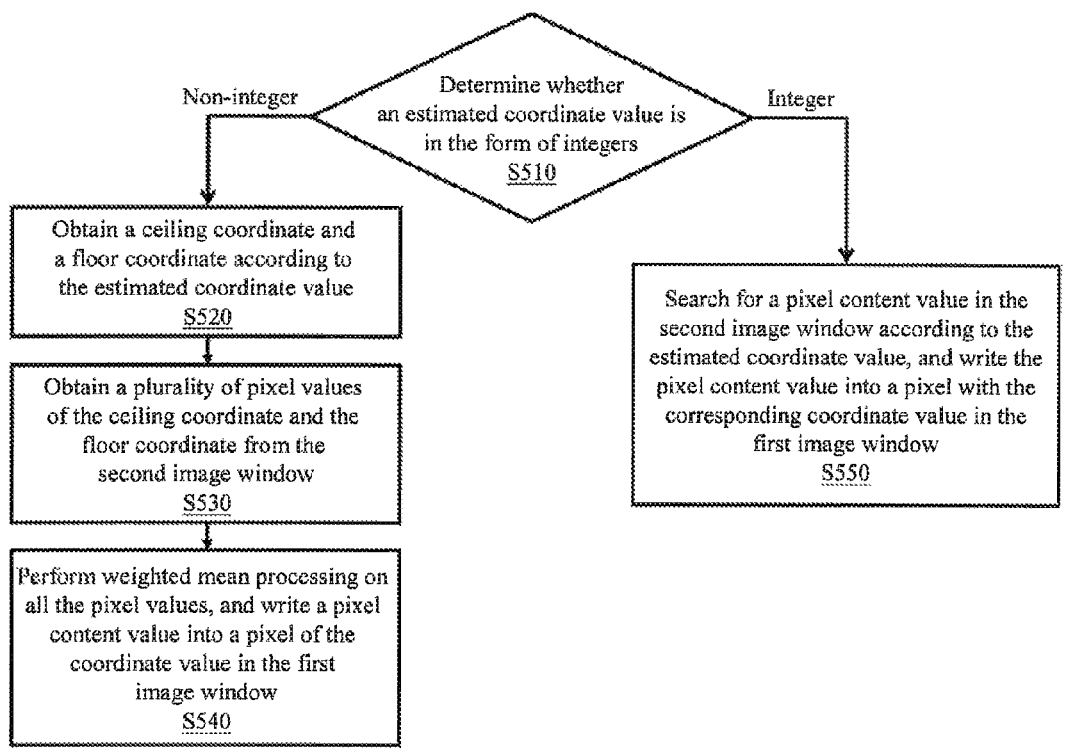
FIG. 5 is a flow chart of processing for an estimated coordinate value according to the disclosure.

FIG. 5 is a flow chart of processing for an estimated coordinate value according to the disclosure. Whether the estimated coordinate value is in the form of integers is determined (step S510). If the estimated coordinate value is not in the form of integers, an upper limit coordinate and a lower limit coordinate are obtained according to the estimated coordinate value (step S520). A plurality of pixel content values of coordinate values between the upper limit coordinate and the lower limit coordinate are obtained from the second image window (step S530). All the obtained pixel content values of the coordinate values between the upper limit coordinate and the lower limit coordinate are weighted and averaged, and the resulting value is written into a pixel with the corresponding coordinate value in the first image window (step S540). If the estimated coordinate value is in the form of integers, a pixel value in the second image window is searched according to the estimated coordinate value, and is written into a pixel with the corresponding coordinate value in the first image window (step S550).

After obtaining the estimated coordinate value, the processing unit 120 determines whether the estimated coordinate value is in the form of integers. When the estimated coordinate value is in the form of integers, the processing unit 120 directly uses the pixel value of the estimated coordinate value in the second image window 320. The processing unit 120 writes the pixel value of the estimated coordinate value into a corresponding pixel in the first block 312.

When the estimated coordinate value is not in the form of integers, the processing unit 120 obtains an upper limit coordinate value and a lower limit coordinate value according to the estimated coordinate value. The upper limit coordinate value is obtained by rounding up the estimated coordinate value. The lower limit coordinate is obtained by rounding down the estimated coordinate value.

For example, a coordinate point (100, 100) is selected from the first block 312, i.e. $X_o=100$ and $Y_o=100$, and the estimated coordinate value is that $X_i=101.79$ and $Y_i=102.13$. The estimated coordinate value is not in the form of integers, so the pixel value cannot be obtained from the estimated coordinate value. Moreover, the estimated coordinate value is in the format of a two-dimensional array, and the estimated coordinate value in this example has two groups of numbers along an X axis and a Y axis respectively. Therefore, the processing unit 120 rounds up and down the estimated coordinate value to obtain four coordinates, which are (101,102), (101,103), (102,102), and (102,103) respectively. The processing unit 120 first obtains the pixel values of the four coordinates from the second image window 320, then weights and averages the four pixel content values to obtain a corresponding pixel content value. The obtained pixel content value will be written into a corresponding pixel of the first block 312. In this and some embodiments, such a weighting and averaging manner can be a bilinear interpolation.

The processing unit 120 then performs above steps on other coordinates in the first image window 310 until all pixels in the first image window 310 are processed.

In this embodiment, the processing unit 120 performs the de-warping processing on the input image in real time. This embodiment is mainly applied to cases where the desired region of the second image 321 is not fixed. Generally, the user can perform electronic panning-tilting-zooming (PTZ) operations, e.g. panning to the right or left, tilting up or down, or zooming in or out, on a panoramic camera. Especially in the zooming process, the proportion of the second block 322 in the second image 321 changes. Through this embodiment, the corresponding first image window 310 can be calculated in real time.

Figure 6:
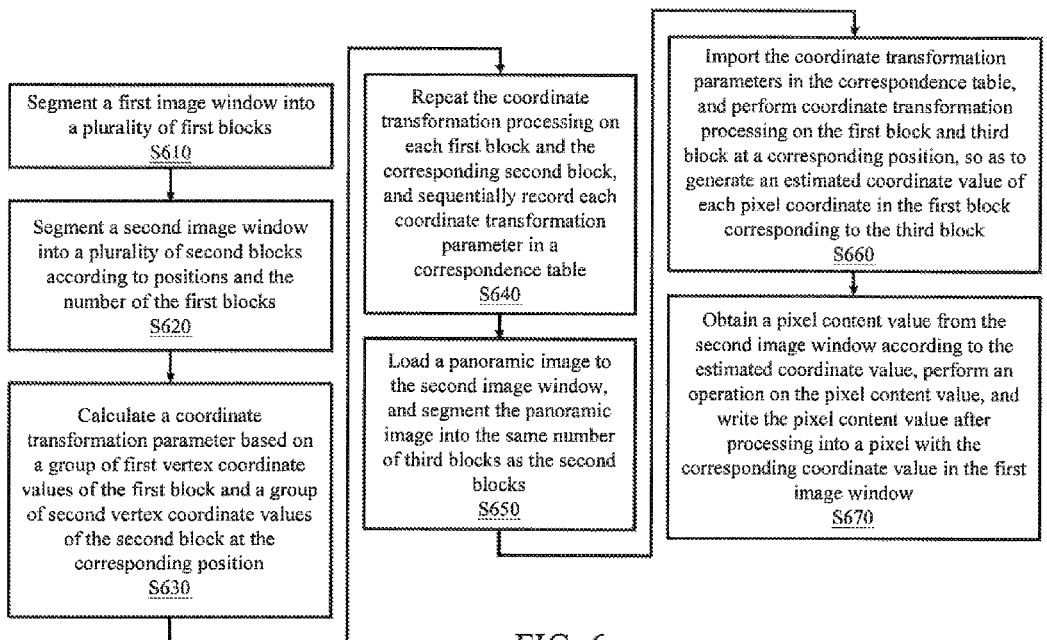
FIG. 6 is a flow chart of calculating estimated coordinate values according to another embodiment of the disclosure.

On the other hand, the disclosure also provides the de-warping processing method for a fixed desire region of a second image 321 according to an embodiment, as shown in FIG. 6. The de-warping processing method includes the following steps.

A first image window is segmented into a plurality of first blocks 312 (step S610). A second image window is segmented into a plurality of second blocks according to locations and an amount of the first blocks (step S620). A group of first vertex coordinate values of one of the first blocks and a group of second vertex coordinate values of corresponding one of the second blocks are used for calculating a coordinate transformation parameter (step S630). In step S640, the step of calculating the coordinate transformation parameter by the group of first vertex coordinate values of the first block and the group of second vertex coordinate values of the corresponding second blocks are repeated for each first block and each corresponding second block, and each coordinate transformation parameter is recorded in a lookup table. A panoramic image is loaded to the second image window, and the panoramic image is segmented into the same amount of third blocks as the second blocks (step S650). According to the coordinate transformation parameters in the lookup table, each of coordinate values of the first blocks is transformed into an estimated coordinate value in the corresponding third block (step S660). A pixel content value is obtained from the second image window according to the estimated coordinate value, and is written into a pixel with the corresponding coordinate value in the first image window (step S670).

The processing unit 120 segments the first image window into the first blocks according to the method described in the previous embodiments. Then the processing unit 120 calculates a coordinate transformation parameter associated with the first block and the second block. After calculating the coordinate transformation parameter, the processing unit 120 writes the coordinate transformation parameter into the lookup table 132.

After completing the lookup table 132, the processing unit 120 stores the lookup table 132 into the storage unit 130. When the image input unit 110 obtains a new image which is defined as a panoramic image, the processing unit 120 loads the panoramic image to the second image window, and segments the panoramic image into the same amount of third blocks as the second blocks. The processing unit 120, according to the coordinate transformation parameters in the lookup table 132, transforms each of coordinate values of the first block into an estimated coordinate value in the third block. The processing unit 120 obtains a pixel content value from the second image window 320 according to the estimated coordinate value, and writes the pixel content value into a pixel with the corresponding coordinate value in the first image window 310. The above process is repeated on each first block 312 until all the pixels of the first image window 310 have their pixel content value.

In the above embodiments, if the second block is severely deformed or covers an excessive area, the obtained estimated coordinate value will have a significant error as compared with an actual coordinate value, which affects the de-warping effect. Such an error can be reduced by decreasing the area of the first block 312. Referring to FIG. 4B, a smallest rectangle (the zone) covering the second blocks 322 is defined as a block 323 (the fourth block). In this embodiment and some embodiments, an area of the block 323 is used as a base for determining a deformation degree and an area of the second block 322. In this embodiment and some embodiments, a threshold value is set, and if the area of the block 323 is greater than the threshold value, the first block 312 is segmented into at least two rectangles (sub-blocks). The segmentation is, for example, along the horizontal axis or along the vertical axis.

The segmentation principle is that each sub-block should comprise two vertex coordinate values of the first block 312. Such segmentation is continued until the area of the block 323 is not greater than the threshold value, and then the coordinate transformation parameter is calculated again.

In order to avoid problems caused by the indefinite segmentation times, a threshold value for segmentation times is defined. If the amount of segmentation times is greater than or equal to the threshold value for segmentation times, the segmentation will stop, and then the coordinate transformation parameter will calculated again.

The de-warping processing method for digital images in the disclosure can be used for restoring deformed images shot by a panoramic shooting device. The disclosure may reduce the operation amount during the de-warping processing, and accelerate the restoration of digital images.

What is claimed is:

1. A de-warping processing method for digital images, used for outputting a first image at a first image window according to a partial region of a second image in a second image window, the de-warping processing method comprising:
   segmenting the first image window into a plurality of first blocks;
   segmenting the second image window into a plurality of second blocks according to an amount of the first blocks and locations of the first blocks;
   calculating a coordinate transformation parameter by a group of first vertex coordinate values of one of the first blocks and a group of second vertex coordinate values of corresponding one of the second blocks;
   transforming coordinate values of the first block into estimated coordinate values of the corresponding second block according to the coordinate transformation parameter;
   obtaining a pixel content value from the second image window according to each of the estimated coordinate values, and writing the pixel content value into a pixel with the corresponding coordinate value in the first block; and
   processing all the first blocks for outputting the first image.

2. The de-warping processing method for digital images according to claim 1, wherein the step of calculating the coordinate transformation parameter comprises:
   defining a zone, which comprises the corresponding second block, as a fourth block, and comparing an area of the fourth block with a threshold value;
   if the area is not greater than the threshold value, calculating the coordinate transformation parameter; and
   if the area is greater than the threshold value, segmenting the first block into at least two sub-blocks, and an area comprising each of the at least two sub-blocks being not greater than the threshold value.

3. The de-warping processing method for digital images according to claim 2, wherein after the step of segmenting the first block into the at least two sub-blocks, the step of calculating the coordinate transformation parameter further comprises: through the at least two sub-blocks, calculating the coordinate transformation parameter.

4. The de-warping processing method for digital images according to claim 1, wherein the step of calculating the coordinate transformation parameter by the group of first vertex coordinate values of the first block and the group of second vertex coordinate values of the corresponding second block comprises:
   defining a first triangle according to the group of first vertex coordinate values of the first block;
   defining a second triangle by the group of second vertex coordinate values of the corresponding second block according to a location of the first triangle; and
   calculating the coordinate transformation parameter according to vertex coordinate values of the first triangle and vertex coordinate values of the corresponding second triangle by an affine transformation formula as follows:

$$\begin{bmatrix} X_i \\ Y_i \end{bmatrix} = \begin{bmatrix} a_1 & a_2 & a_3 \\ b_1 & b_2 & b_3 \end{bmatrix} \begin{bmatrix} X_o \\ Y_o \\ 1 \end{bmatrix};$$

wherein $(X_i, Y_i)$ is the vertex coordinate value of the corresponding second triangle, $(X_o, Y_o)$ is the vertex coordinate value of the first triangle, and $(a_1, a_2, a_3, b_1, b_2, b_3)$ is the coordinate transformation parameter.

5. The de-warping processing method for digital images according to claim 4, wherein the step of calculating the coordinate transformation parameter by the group of first vertex coordinate values of the first block and the group of second vertex coordinate values of the corresponding second block further comprises:
   defining a third triangle in the first block, and the first triangle not overlapping the third triangle; and
   calculating the coordinate transformation parameter according to vertex coordinate values of the third triangle and vertex coordinate values of a fourth triangle corresponding to the third triangle by an affine transformation formula as follows:

$$\begin{bmatrix} X_j \\ Y_j \end{bmatrix} = \begin{bmatrix} a_1 & a_2 & a_3 \\ b_1 & b_2 & b_3 \end{bmatrix} \begin{bmatrix} X_k \\ Y_k \\ 1 \end{bmatrix};$$

wherein $(X_j, Y_j)$ is the vertex coordinate of the fourth triangle, $(X_k, Y_k)$ is the vertex coordinate of the third triangle, and $(a_1, a_2, a_3, b_1, b_2, b_3)$ is the coordinate transformation parameter.

6. The de-warping processing method for digital images according to claim 1, wherein the step of calculating the coordinate transformation parameter by the group of first vertex coordinate values of the first block and the group of second vertex coordinate values of the corresponding second block comprises:
   calculating the coordinate transformation parameter according to the vertex coordinate values of the one of the plurality of first blocks and the vertex coordinate values of the corresponding second block by the following formula:

$$X_i = \frac{a_1 X_o + a_2 Y_o + a_3}{c_1 X_o + c_2 Y_o + 1}$$

$$Y_i = \frac{b_1 X_o + b_2 Y_o + b_3}{c_1 X_o + c_2 Y_o + 1};$$

wherein $(X_i, Y_i)$ is the vertex coordinate value of the corresponding second block, $(X_o, Y_o)$ is the vertex coordinate value of the first block, and $(a_1, a_2, b_1, b_2, c_1, c_2)$ is the coordinate transformation parameter.

7. The de-warping processing method for digital images according to claim 1, wherein the step of obtaining the pixel content value according to each of the estimated coordinate values, writing the pixel content value into the pixel with the corresponding coordinate value in the first block comprises:
   determining whether the estimated coordinate value is in the form of integers;
   if the estimated coordinate value is not in the form of integers, obtaining a upper limit coordinate and a lower limit coordinate according to the estimated coordinate value;
   obtaining the pixel values of the second image window according to the upper limit coordinate value and the lower limit coordinate value;
   weighting and averaging the obtained pixel values, and writing the pixel content value into the pixel with the corresponding coordinate value in the first image window; and
   if the estimated coordinate value is in the form of integers, searching for the pixel content value of the second image window according to each of the estimated coordinate values, and writing the pixel content value into the pixel with the corresponding coordinate value in the first image window.

8. A de-warping processing method for digital images, used for outputting a first image in a first image window according to a partial region of a second image in a second image window, the de-warping processing method comprising:
   segmenting the first image window into a plurality of first blocks;
   segmenting the second image window into a plurality of second blocks according to an amount of the plurality of first blocks and locations of the plurality of first blocks;
   calculating a coordinate transformation parameter by a group of first vertex coordinate values of one of the plurality of first blocks and a group of second vertex coordinate values of corresponding one of the plurality of second blocks;
   repeating the step of calculating the coordinate transformation parameter by the group of first vertex coordinate values of the one of the plurality of first blocks and the group of second vertex coordinate values of the corresponding one of the plurality of second blocks until all the plurality of first blocks are processed, and then recording the coordinate transformation parameters in a lookup table;
   loading a panoramic image into the second image window, and segmenting the panoramic image into a plurality of third blocks, wherein an amount of the plurality of third blocks is the same as an amount of the plurality of second blocks;
   according to the coordinate transformation parameters in the lookup table, transforming each of coordinate values of the first blocks into an estimated coordinate value in the corresponding third block; and
   obtaining a pixel content value from the second image window according to each of the estimated coordinate values, and writing the pixel content value into a pixel with the corresponding coordinate value in the first image window.

9. The de-warping processing method for digital images according to claim 8, wherein the step of calculating the coordinate transformation parameter by the group of first vertex coordinate values of the first block and the group of second vertex coordinate values of the corresponding second block comprises:
   defining a zone comprising the corresponding second block as a fourth block, and comparing an area of the fourth block with a threshold value;
   if the area is not greater than the threshold value, calculating the coordinate transformation parameter by using the first block and the corresponding second block; and
   if the area is greater than the threshold value, segmenting the first block into at least two sub-blocks, and an area comprising each of the at least two sub-blocks being not greater than the threshold value.

10. The de-warping processing method for digital images according to claim 9, wherein after the step of segmenting the first block into the at least two sub-blocks, the step of calculating the coordinate transformation parameter by the group of first vertex coordinate values of the first block and the group of second vertex coordinate values of the corresponding second block further comprises: through the at least two sub-blocks, and calculating the coordinate transformation parameter.

11. The de-warping processing method for digital images according to claim 8, wherein the step of calculating the coordinate transformation parameter by the group of first vertex coordinate values of the first block and the group of second vertex coordinate values of the corresponding second block comprises:
   defining a first triangle by the group of first vertex coordinate values of the first block;
   defining a second triangle by the group of second vertex coordinate values of the corresponding second block according to a location of the first triangle; and
   calculating the coordinate transformation parameter according to vertex coordinate values of the first triangle and vertex coordinate values of the second triangle by an affine transformation formula as follows:

$$\begin{bmatrix} X_i \\ Y_i \end{bmatrix} = \begin{bmatrix} a_1 & a_2 & a_3 \\ b_1 & b_2 & b_3 \end{bmatrix} \begin{bmatrix} X_o \\ Y_o \\ 1 \end{bmatrix};$$

wherein $(X_i, Y_i)$ is the vertex coordinate value of the second triangle, $(X_o, Y_o)$ is the vertex coordinate value of the first triangle, and $(a_1, a_2, a_3, b_1, b_2, b_3)$ is the coordinate transformation parameter.

12. The de-warping processing method for digital images according to claim 11, wherein the step of calculating the coordinate transformation parameter according to the group of first vertex coordinate values of the first block and the group of second vertex coordinate values of the corresponding second block comprises:
   selecting a third triangle from the first block, and the first triangle not overlapping the third triangle; and
   calculating the coordinate transformation parameter according to vertex coordinate values of the third triangle and vertex coordinate values of a fourth triangle corresponding to the third triangle, by a following affine transformation formula:

$$\begin{bmatrix} X_j \\ Y_j \end{bmatrix} = \begin{bmatrix} a_1 & a_2 & a_3 \\ b_1 & b_2 & b_3 \end{bmatrix} \begin{bmatrix} X_k \\ Y_k \\ 1 \end{bmatrix};$$

wherein $(X_j, Y_j)$ is the vertex coordinate value of the fourth triangle, $(X_k, Y_k)$ is the vertex coordinate value of the third triangle, and $(a_1, a_2, a_3, b_1, b_2, b_3)$ is the coordinate transformation parameter.

13. The de-warping processing method for digital images according to claim 8, wherein the step of calculating the coordinate transformation parameter by the group of first vertex coordinate values of the first block and the group of second vertex coordinate values of the corresponding second block comprises:

calculating the coordinate transformation parameter according to the vertex coordinate values of the first block and the vertex coordinate values of the corresponding second block, by the following formula:

$$X_i = \frac{a_1 X_o + a_2 Y_o + a_3}{c_1 X_o + c_2 Y_o + 1}$$
$$Y_i = \frac{b_1 X_o + b_2 Y_o + b_3}{c_1 X_o + c_2 Y_o + 1};$$

wherein $(X_i, Y_i)$ is the vertex coordinate value of the second block, $(X_o, Y_o)$ is the vertex coordinate value of the first block, and $(a_1, a_2, b_1, b_2, c_1, c_2)$ is the coordinate transformation parameter.

14. The de-warping processing method for digital images according to claim 8, wherein the step of obtaining the pixel content value from the second image window according to the estimated coordinate value and writing the pixel content value into the pixel with the corresponding coordinate value in the first image window comprises:

determining whether the estimated coordinate value is in the form of integers;

if the estimated coordinate value is not in the form of integers, obtaining a upper limit coordinate value and a lower limit coordinate value according to the estimated coordinate value;

obtaining a plurality of pixel values from the second image window according to the upper limit coordinate and the lower limit coordinate;

weighting and averaging the pixel values to obtain the pixel content value, and writing the pixel content value into the pixel with the corresponding coordinate value in the first image window; and if the estimated coordinate value is in the form of integers, searching for the pixel content value of the second image window according to the estimated coordinate value, and writing the pixel content value into the pixel with the corresponding coordinate value in the first image window.

* * * * *